(12) United States Patent
Landais et al.

(10) Patent No.: US 12,200,616 B2
(45) Date of Patent: Jan. 14, 2025

(54) EDGE COMPUTING

(71) Applicant: NOKIA TECHNOLOGIES OY, Espoo (FI)

(72) Inventors: Bruno Landais, Pleumeur-Bodou (FR); Shubhranshu Singh, Seeheim-Jugenheim (DE); Laurent Thiebaut, Antony (FR); Dinh Thai Bui, Chatenay Malabry (FR); Bivudendu Pratap Rout, Bangalore (IN)

(73) Assignee: NOKIA TECHNOLOGIES OY, Espoo (FI)

( * ) Notice: Subject to any disclaimer, the term of this patent is extended or adjusted under 35 U.S.C. 154(b) by 456 days.

(21) Appl. No.: 17/719,957

(22) Filed: Apr. 13, 2022

(65) Prior Publication Data

US 2022/0330140 A1 Oct. 13, 2022

(30) Foreign Application Priority Data

Apr. 13, 2021 (IN) .............................. 202111017224

(51) Int. Cl.
| | | |
|---|---|---|
| *H04W 48/16* | (2009.01) | |
| *H04L 65/1069* | (2022.01) | |
| *H04W 48/18* | (2009.01) | |
| *H04W 60/04* | (2009.01) | |
| *H04L 65/1016* | (2022.01) | |
| *H04L 65/80* | (2022.01) | |

(52) U.S. Cl.
CPC ........... *H04W 48/16* (2013.01); *H04W 48/18* (2013.01); *H04W 60/04* (2013.01)

(58) Field of Classification Search
CPC ..... H04W 48/16; H04W 48/18; H04W 60/04; H04L 65/1016; H04L 65/80; H04L 65/1069
See application file for complete search history.

(56) References Cited

U.S. PATENT DOCUMENTS 10,999,787 B2 * 5/2021 Dao ....................... H04W 48/18
11,483,680 B2 * 10/2022 Dao ....................... H04L 12/185
(Continued)

OTHER PUBLICATIONS

3GPP TS 23.548 V0.1.0 (Mar. 2021), Technical Specification, 3rd Generation Partnership Project; Technical Specification Group Services and System Aspects; 5G System Enhancements for Edge Computing; Stage 2 (Release 17), Mar. 2021.
(Continued)

*Primary Examiner* — Ahmed Elallam
(74) *Attorney, Agent, or Firm* — SQUIRE PATTON BOGGS (US) LLP

(57) ABSTRACT

Methods and apparatuses for edge services are disclosed. A network function entity receives from an application function entity a request relating to a data communication session, and can then determine, in response to the request, information of at least one local network exposure function entity for the application function entity. The application function entity is provided with the information of the at least one local network exposure function entity. The information can be used in connecting with a local network exposure function entity. The local network exposure function entity can then be used for the data communication session.

20 Claims, 6 Drawing Sheets

Send a request relating to a data communication session to a network function entity — 110

Receive information about at least one local network exposure function entity — 112

Use a local network exposure function entity for the data communication session accordingly — 114

(56) References Cited

U.S. PATENT DOCUMENTS

| | | | | |
|---|---|---|---|---|
| 11,653,178 | B2* | 5/2023 | Qiao | H04W 4/026 |
| | | | | 455/456.3 |
| 12,052,594 | B2* | 7/2024 | Lee | H04W 24/10 |
| 2019/0261260 | A1 | 8/2019 | Dao et al. | |
| 2022/0294868 | A1* | 9/2022 | Muralidhara | H04W 48/18 |
| 2024/0179081 | A1* | 5/2024 | Purkayastha | H04L 41/0806 |

OTHER PUBLICATIONS

3GPP TS 23.502 V17.0.0 (Mar. 2021), Technical Specification, 3rd Generation Partnership Project; Technical Specification Group Services and System Aspects; Procedures for the 5G System (5GS); Stage 2 (Release 17), Mar. 2021.

Extended Search Report dated Sep. 2, 2022, corresponding to European Patent Application No. 22167264.5.

"3rd Generation Partnership Project; Technical Specification Group Services and System Aspects; 5G System Enhancements for Edge Computing; Stage 2 (Release 17)", 3GPP Standard; Technical Specification; 3GPP TS 23.548, 3rd Generation Partnership Project (3GPP), Mobile Competence Centre; 650, Route Des Lucioles; F-06921 Sophia-Antipolis Cedex; France, vol. SA WG2, No. V0.1.0, Mar. 15, 2021, pp. 1-32.

Intel et al: "Clarification on NEF discovery by an AF", 3GPP Draft; S2-1908596_E MAIL_REV2_S2-1907910_NEFDISCOVERY_ 23502-MS, 3rd Generation Partnership Project (3GPP), Mobile Competence Centre; 650, Route Des Lucioles; F-06921 Sophia Antipolis Cedex; FR, vol. SA WG2, No. Sapporo, Japan, Jul. 8, 2019.

Ericsson: "NEF discovery and selection", 3GPP Draft; S2-1907059_ ENA_23501 NEF Discovery, 3rd Generation Partnership Project (3GPP), Mobile Competence Centre; 650, Route Des Lucioles; F-06921 Sophia Antipolis Cedex; FR, vol. SA WG2, No. Sapporo, Japan, Jun. 18, 2019.

Communication pursuant to Article 94(3) EPC dated Jun. 25, 2024 corresponding to European Patent Application No. 22167264.5.

* cited by examiner

EDGE COMPUTING

FIELD

The present disclosure relates to methods, apparatuses and computer program products for edge computing, and more particularly to network exposure function.

BACKGROUND

A communication system provides a facility communication between two or more devices such as user terminals, machine-like terminals, base stations and other access points, network entities, service provider entities and/or other devices. A communication system can be provided for example by means of a communication network and one or more compatible devices providing communication channels for carrying information between the communicating entities. Communication sessions may comprise, for example, communication of data for carrying communications for services such as voice, video, electronic mail (email), text message, multimedia, control data and/or content data and so on.

In a mobile or wireless communication system at least a part of a communications between at least two devices occurs over a wireless or radio link. Examples of wireless systems comprise public land mobile networks (PLMN), satellite-based communication systems and different wireless local networks, for example wireless local area networks (WLAN). A user can access the wider communication system via an access system means of an appropriate communication device or terminal. Non-limiting examples of communication devices are a user equipment (UE) or user device and various machine-like terminals. The wireless access can be provided by a base station of a radio access system or network (RAN). Radio access systems provide local coverage areas and are connected to a larger communication system, known as the core network.

The core network comprises a wide variety of entities providing various functions and services. Similar functions and/or services may be provided by different entities in separate locations and/or by distributed data processing. At least some of the functions and/or services may be provided by virtual data processing instances. Providing data communications between the accessing devices and the service providing entities such as application functions can involve intermediate and otherwise associated entities, processes and functions.

The communication system and associated devices typically operate in accordance with a given standard or specification which sets out what the various entities associated with the system are permitted to do and how that should be achieved. Communication protocols and/or parameters which shall be used for the connection are also typically defined. Nin-limiting examples of communication systems include those based on fifth generation (5G) networks standardized by the 3rd Generation Partnership Project (3GPP).

A feature of modern communication systems is known as edge computing. Examples of edge computing include mobile edge computing (MEC) and fog computing. The edge computing aims to provide resources, such as processing and storage, close to an end user. One of the entities involved in providing edge computing is a network exposure function. The herein described examples aim to address one or several issues with edge computing, and more particularly network exposure function entities.

SUMMARY

In accordance with an aspect there is provided a method, comprising: receiving in a network function entity from an application function entity a request relating to a data communication session; determining, in response to the request, information of at least one local network exposure function entity for the application function entity; and providing the application function entity with the information of the at least one local network exposure function entity.

According to another aspect there is provided a method, comprising: sending a request relating to a data communication session to a network function entity; receiving in response information about at least one local network exposure function entity; and using a local network exposure function entity for the data communication session accordingly.

According to another aspect there is provided apparatus for providing a network function entity, the apparatus comprising at least one processor and at least one memory including a computer program code, the at least one memory and computer program code configured to, with the at least one processor, cause the apparatus at least to: receive from an application function entity a request relating to a data communication session; determine, in response to the request, information of at least one local network exposure function entity for the application function entity; and provide the application function entity with the information of the at least one local network exposure function entity.

According to another aspect there is provided apparatus for providing an application function, the apparatus comprising at least one processor and at least one memory including a computer program code, the at least one memory and computer program code configured to, with the at least one processor, cause the apparatus at least to: send a request relating to a data communication session to a network function entity; receive in response information about at least one local network exposure function entity; and use a local network exposure function entity for the data communication session accordingly.

In accordance with an aspect a local network exposure function entity is selected for the application function entity by a network function. The network function informs the application function entity of the selected local network exposure function entity. Redirection of the network exposure function to the selected local network exposure function entity may be provided.

In accordance with an aspect at least one suitable local network exposure function entity is determined by a network function. The application function entity can be provided with information about the at least one suitable local network exposure function entity to assist the application function entity in selecting a local network exposure function entity. The application function entity can use the assistance information in making the final selection. The selection can involve discovery. The application function entity mat be provided with information indicating at least one optimal local network exposure function entity and/or information how to discover a local network exposure function entity.

An indication can be included in the request of a need to determine at least one local network exposure function entity for the requesting application function entity. It can also be determines based on a configuration that there is a need to determine at least one local network exposure function for the requesting application function entity.

A session management function entity may provide information identifying or otherwise associated with a packet data unit (PDU) session anchor associated with the session. The at least one local network exposure function entity may be discovered from a repository function based on the information of the PDU session anchor. Various types of location information may be taken into account in selection of a local network exposure function entity. The location information may comprise at least one of a location identifier of an associated user plane function, a tracking area identifier, and information of location of a device using the application function entity.

The network function entity may comprise a network exposure function entity.

Means for implementing the herein disclosed operations and functions can also be provided.

A computer software product embodying at least a part of the herein described functions may also be provided. In accordance with an aspect a computer program comprises instructions for performing at least one of the methods described herein.

BRIEF DESCRIPTION OF DRAWINGS

Some aspects will now be described in further detail, by way of example only, with reference to the following examples and accompanying drawings, in which.

DETAILED DESCRIPTION OF EXAMPLES

The following description gives an exemplifying description of some possibilities and useful background information to practise the invention. Although the specification may refer to "an", "one", or "some" examples or embodiment(s) in several locations of the text, this does not necessarily mean that each reference is made to the same example of embodiment(s), or that a particular feature only applies to a single example or embodiment. Single features of different examples and embodiments may also be combined to provide other embodiments.

Figure 1:
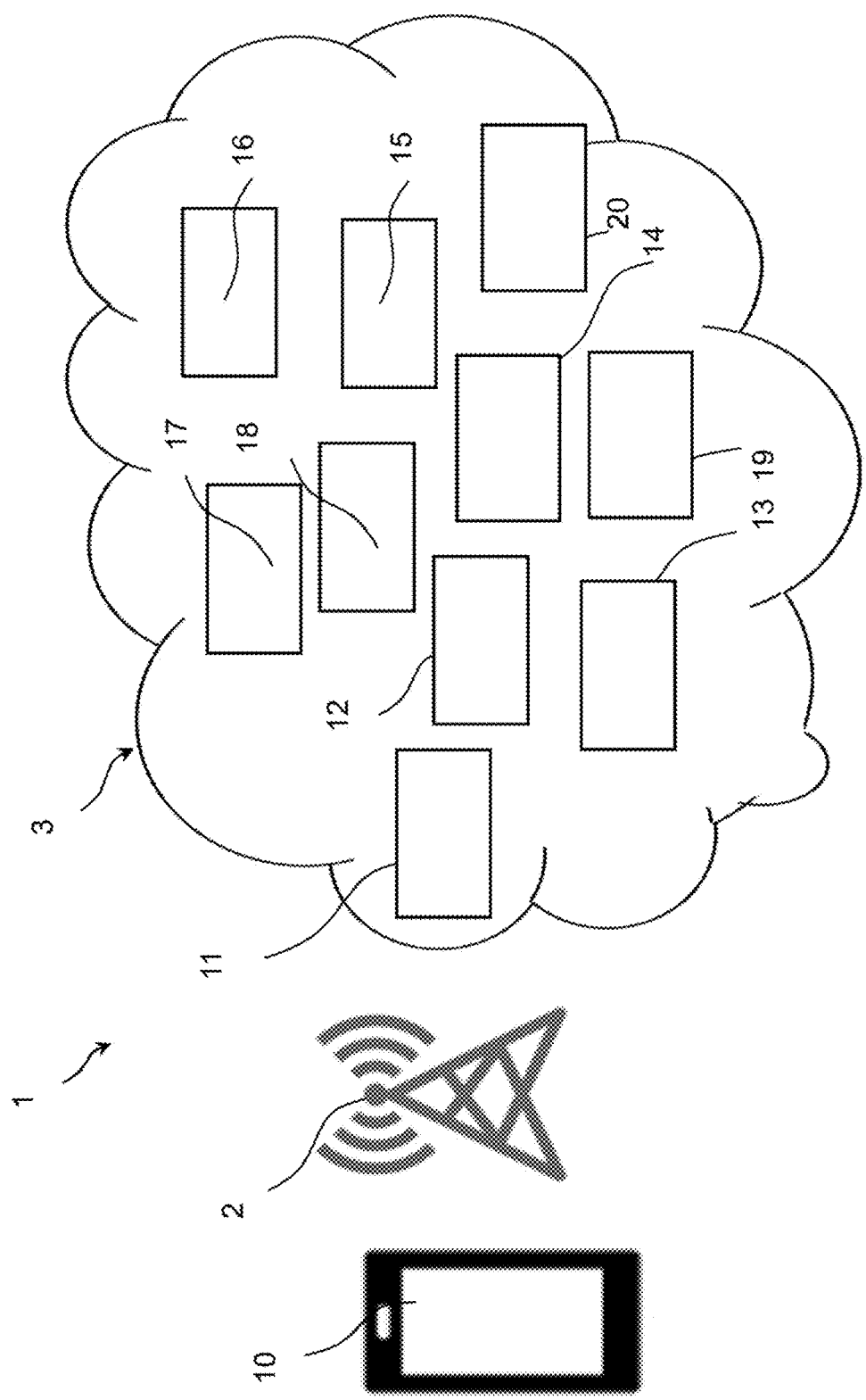
FIG. 1 illustrates a schematic example of a system where the herein disclosed principles can be practiced.

FIG. 1 shows a schematic presentation of system 1 comprising a radio access system 2 (radio access network; RAN) and a core network (CN) system shown as cloud 3. A radio access system can comprise one or a plurality of access points. A number of radio access systems can be connected to the core network. In FIG. 1 the access point and the radio access system are schematically presented by a base station. An access point can comprise any node that can transmit/receive radio signals (e.g., a TRP, a base station such as gNB, eNB, a user device such as a UE and so forth). An example of wireless access architecture is 3GPP 5G radio access architecture. The communication device may access to the Core Network via NG RAN (possibly including satellite access) or via other technologies like Untrusted Non 3GPP access to 5G core (using e.g. a N3IWF), Trusted Non 3GPP access to 5G core (using e.g. a TNGF/TWIF) or Wireline Access (using e.g. a W-AGF or AGF). However, embodiments are not limited to such an architecture.

A communications device 10 can be located in the service area of the radio access system 2 and can thus communicate wirelessly with the access point provided by the system 2. The communications device 10 is an example of a user which can request for one or more services provided by entities of the core network 3. The device can be associated with a unique user identity. The user identity may be assigned to the device, to a user of the device or a subscription by a user of the device. The device 10 may be any suitable communications device adapted for wireless communications. Non-limiting examples comprise a mobile station (MS) (e.g., a mobile device such as a mobile phone or what is known as a 'smart phone'), a computer provided with a wireless interface card or other wireless interface facility (e.g., USB dongle), personal data assistant (PDA) or a tablet provided with wireless communication capabilities, machine-type communications (MTC) devices, Internet of Things (IoT) type communications devices or any combinations of these or the like. The device may be provided as part of another device. The device may receive signals over an air or radio interface via appropriate apparatus for receiving and may transmit signals via appropriate apparatus for transmitting radio signals. The communications can occur via multiple paths. Multiple input multiple output (MIMO) type communications may be provided with multiantenna elements.

The wider communication system (core network) 3 can comprise a 5G core network (5GC) and entities providing one or more interconnected network functions (NF). The system can comprise one or more data networks (DN). In FIG. 1 blocks 11 to 20 denote various possible network entities. The non-liming and non-exhaustive list of these include an access and mobility management function (AMF) 11, a session management function (SMF) 12, a local PDU session anchor user plane function (L-PSA UPF) 13, a policy control function (PCF) 14, an application function (AF) 16, and a network repository function (NRF) 17.

A further network exposure function, and more particularly a local NEF (L-NEF) 19, is also shown. The roles and possible NEF selection methods are explained below in more detail.

Other management, control and application functions 20 are also possible. For example, entities providing an edge application server (EAS), a unified data management (UDM), a unified data repository (UDR) and various user plane functions may be provided. A plurality of content providers can also be provided. It shall be appreciated that at least some of the entities denoted by blocks 11 to 20 can be provided as virtual data processing instances in virtualized environment.

Figure 2:
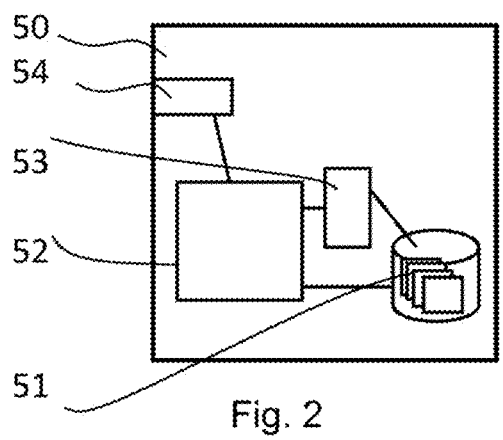
FIG. 2 shows an example of a control apparatus.

Functions of devices such as the access point 2 or the accessing device 10, or equipment of the service developers and/or providers and any of the network entities 11 to 20 can be provided by data processing apparatus. The data processing can be provided by apparatus comprising at least one processor and at least one memory. FIG. 2 shows an example of a data processing apparatus 50 comprising processor(s) 52, 53 and memory or memories 51. FIG. 2 further shows connections between the elements of the apparatus and an interface for connecting the data processing apparatus to other components of the device. The at least one memory may comprise at least one ROM and/or at least one RAM. The communications device may comprise other possible components for use in software and hardware aided execution of tasks it is designed to perform and implementing the herein described features. The at least one processor can be coupled to the at least one memory. The at least one processor may be configured to execute an appropriate software code to implement one or more of the following aspects. The software code may be stored in the at least one memory, for example in the at least one ROM.

The processing may be distributed between several processors. The processing may be provided by virtual data processing instances such as virtual machines or separated cores (containers) operated on a shared operating system resource. In this specification the term entity covers such virtual data processing instances.

A device, for example the user equipment (UE) 10 can register itself with relevant core network function or functions to be able to access and use the desired service available in the system 1. For example, the device may need to register with the access and mobility management function (AMF) 11. The user equipment (UE) can establish a protocol data unit (PDU) session. The session establishment can comprise involving a Session Management Function (SMF). A session where an application function (AF) is used can involve use of one of more network exposure functions (NEF).

A NEF provides a means to securely expose the services and capabilities provided by core network functions and facilitates secure, robust, developer-friendly access to the exposed network services and capabilities. NEF can be used to hide specific network technology from applications and user devices. The user devices can move between e.g. 4G and 5G based systems. The NEF consolidates APIs and presenting unified access to the API framework for application developers.

5G System enhancements are being defined for Edge Computing in 3GPP Rel-17, see in particular TS 23.548. Details related to a local NEF are provided by this specification. Some real time network information (e.g. Quality of Service; QoS monitoring results) that are useful for applications can be exposed timely to a local application function (AF) and edge application server (EAS) via a local NEF at the edge of the network. Clause 6.4.2 of 3GPP TS 23.548 can be referred to for more detail of this use example.

The below detailed examples assume TS 23.548 based arrangement for the location of SMF, EAS, and AF providing entities that are involved in serving a UE invoking an EAS. The 5GC and edge application deployment capabilities ensure that the edge application servers supporting the application used by the UE are deployed locally in relation to the UE, i.e., "near" to where the UE is located. For this purpose, a user plane function (UPF) acting as PSA (this provides an interface to the N6 network where EAS are deployed) is selected locally with regards to the UE. The EAS use the services of an application function (AF) to request information about the UE (e.g. information about the delay between the UE and the EAS). The AF is typically located near the EAS.

The below examples explain in more detail how a network exposure function to Edge Application Server can be provided via a local NEF, and how an AF can discover and select a local NEF. This can include relocation scenarios such as re-selection of the local NEF when the UE moves and the local PSA UPF is changed. In some scenarios use of a locality may be based on assumption that an application function (AF) and the public land mobile network (PLMN) have some agreements on which "locality" information to use. Some of the examples described herein address this complexity which might otherwise cause operational overhead, especially if the AF operator is not the same as PLMN operator who deploys the local NEF. A notification can be provided to the AF of the most optimal local NEF, or a list of suitable local NEFs. This can be beneficial, e.g., if an AF subscribes to a low latency exposure of QoS Monitoring results via a non-optimal NEF, i.e. via a NEF that is not a not a local NEF. If a NRF NF Discovery Response contains multiple candidate NEFs, assistance information may be provided to the AF for use in the selection of an optimal NEF.

In accordance with the herein disclosed principles a network function entity can provide information for an application function (AF) of a network exposure function (NEF) to be used for the session. The network function entity can comprise a NEF which then points the AF to another, more suitable local NEF. This can be provided by selection of a local NEF or providing information assisting the AF to select and/or locate a local NEF.

Figure 3:
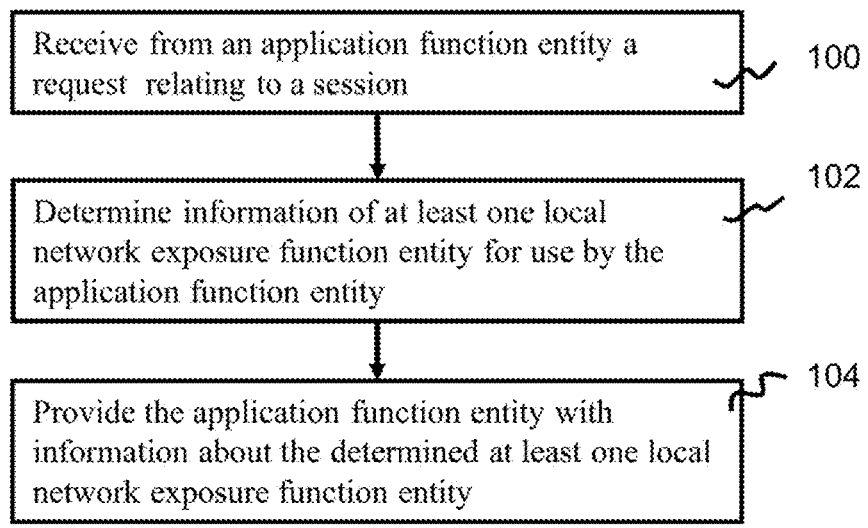
FIGS. 3, 4, 5, 6 and 7 are flowcharts according to certain examples.

FIG. 3 shows a flowchart for an example method where a network function entity receives at 100 from an application function entity a request relating to a data communication session. A determination is then performed at 102, in response to the request, to provide information of at least one local network exposure function entity for the application function entity. The application function entity is provided at 104 with information about at least one local network exposure function entity.

Figure 4:
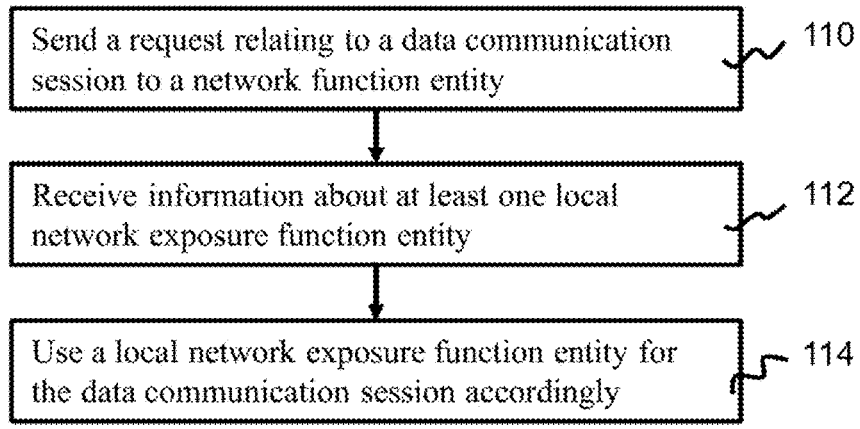

FIG. 4 illustrates a method at an application function entity. In the method a request relating to a data communication session is sent at 110 to a network function entity. At 112 information about at least one local network exposure function entity is received. This information may, e.g., identify a local network exposure function or be information that assists in discovering and/or selecting a local network exposure function. A local network exposure function entity is then used at 114 for the data communication session accordingly.

Figure 5:
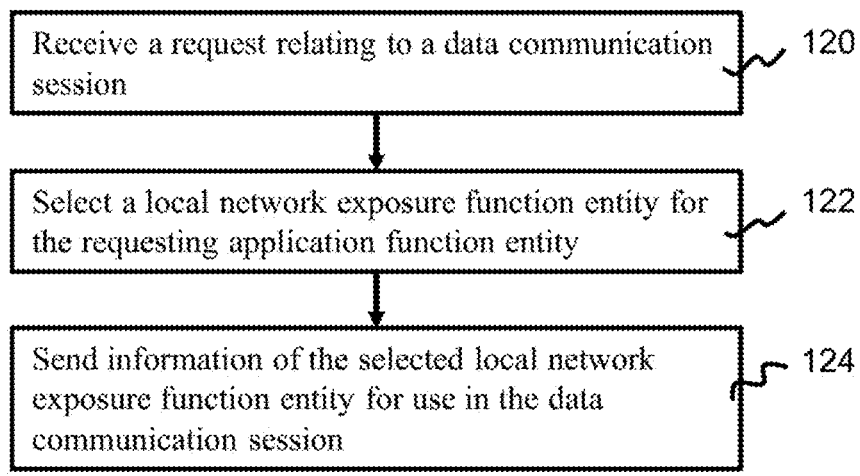

FIG. 5 shows a flowchart for an example where a local network exposure function entity is selected at the network at 122 for the application function entity based on a request received at 120. The application function entity is informed at 124 of the selected local network exposure function entity. A redirection of the network exposure function to the selected local network exposure function entity may be provided.

Figure 6:
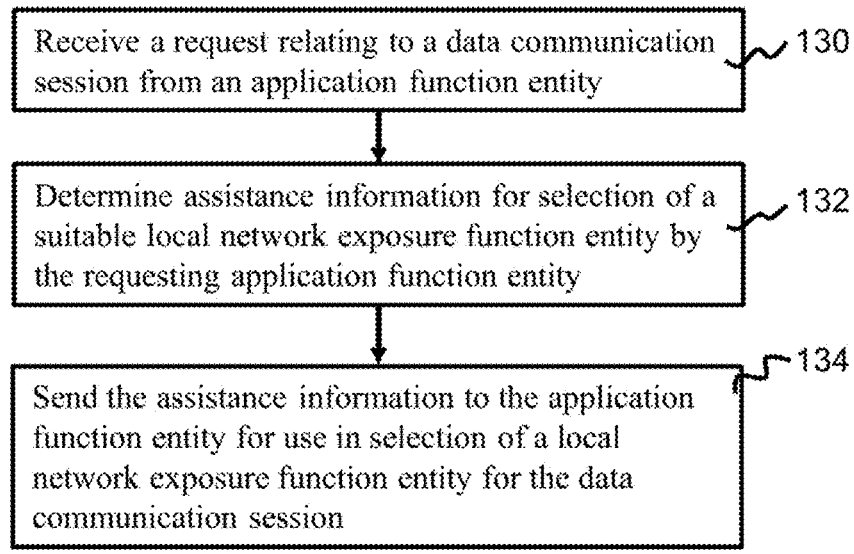

FIG. 6 shows an example where a request relating to a data communication session is received by a network function entity from an application function entity at 130. At 132 assistance information for use in selection of at least one suitable local network exposure function entity is determined. The assistance information can be related with at least one suitable local network exposure function entity. The application function entity can then be provided at 134 with the assistance information to assist the application function entity in selecting a local network exposure function entity.

Figure 7:
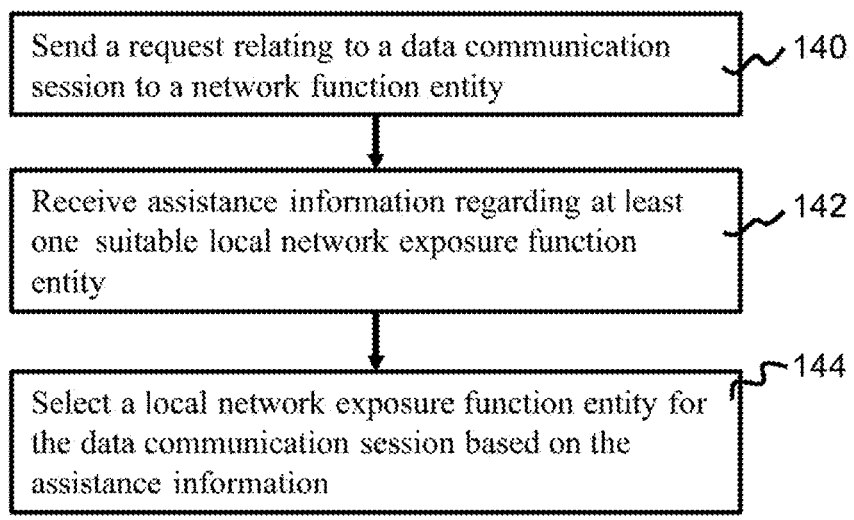

FIG. 7 shows an example where an application function entity sends at 140 a request relating to a data communication session to a network function entity and receives at 142 assistance information regarding at least one suitable local network exposure function entity. The application function entity can then use at 144 this assistance information in selecting a local network exposure function entity for the data communication session. The selection may include discovery. The application function entity may be provided with information indicating at least one optimal local network exposure function entity and/or information how to discover a local network exposure function entity.

The application function entity can use the assistance information to invoke an NRF and discover suitable local network exposure function entities for the data communication session. The application function entity can select a local network exposure function entity for the data communication session.

The method can comprise determining, in response to an indication included in the request, a need to determine information of at least one suitable local network exposure function entity for the requesting application function entity. The determining may also be triggered based on a configuration for the requesting application function entity.

Location information can be taken into account when determining and selecting of local network exposure function entities. The location information may comprise at least one of a location identifier of an associated local user plane function, a tracking area identifier, information of location of a device using the application function entity, and so forth information helpful in determining optimally located NEF. A session management function entity may provide information identifying a local packet data unit (PDU) session anchor associated with the session. The at least one local network exposure function entity may be discovered from a repository function based on the information identifying the local PDU session anchor and/or location thereof.

The network function entity may comprise a network exposure function entity the application function first makes a contact.

The following describes in more detail certain illustrative examples and non-limiting aspects of operations, configurations and signaling for source specific multicast using 3GPP 5G radio access network (RAN) and core network (5GC) terminology.

In accordance with a more detailed example of procedures related to Network Exposure are provided where, e.g., Edge Application Server is located near to an application function (AF) and is served via a local NEF for improved latency. In this example the public land mobile network (PLMN) serving the user equipment (UE) can be responsible of an optimal local NEF selection. The AF may issue a request to any NEF of the PLMN. The NEF receiving the request can then determine an optimal local NEF to use for the PDU session/DNAI (Data Network Access Identifier). The NEF may also redirect the AF request to the selected local NEF. By this the NEF functionalities may be enhanced to support optimal NEF determination and thus enabling (e.g. QoS monitoring) information exposure (about the UE) to AF via local NEF.

The AF can send a request to any NEF for exposure results, providing information enabling to identify the UE's PDU session (e.g. UE IP address). The NEF then determines the optimal local NEF (if this is not already the optimal NEF), e.g., by retrieving from the SMF information identifying a local PSA in the path of the PDU session. Information of the current location of the UE may also be obtained.

An NF Discovery Request may be issued to the NRF to find NEFs that are the closest to the local PSA or user location. According to an alternative the determination of the optimal NEF may also rely on network topology and/or configuration information. A SMF may provide to the requester, i.e. the NEF, a PSA-UPF location identifier (ID) of the local PSA inserted in the path of the PDU session. The local NEF can be registered in the NRF with the PSA-UPF Location ID. Thus the NRF can support a request to discover the NEF using PSA-UPF location ID as a discovery criteria. The NEF that received the AF request can then redirect the AF request to the optimal NEF e.g. by sending a HTTP redirection message.

Figure 8:
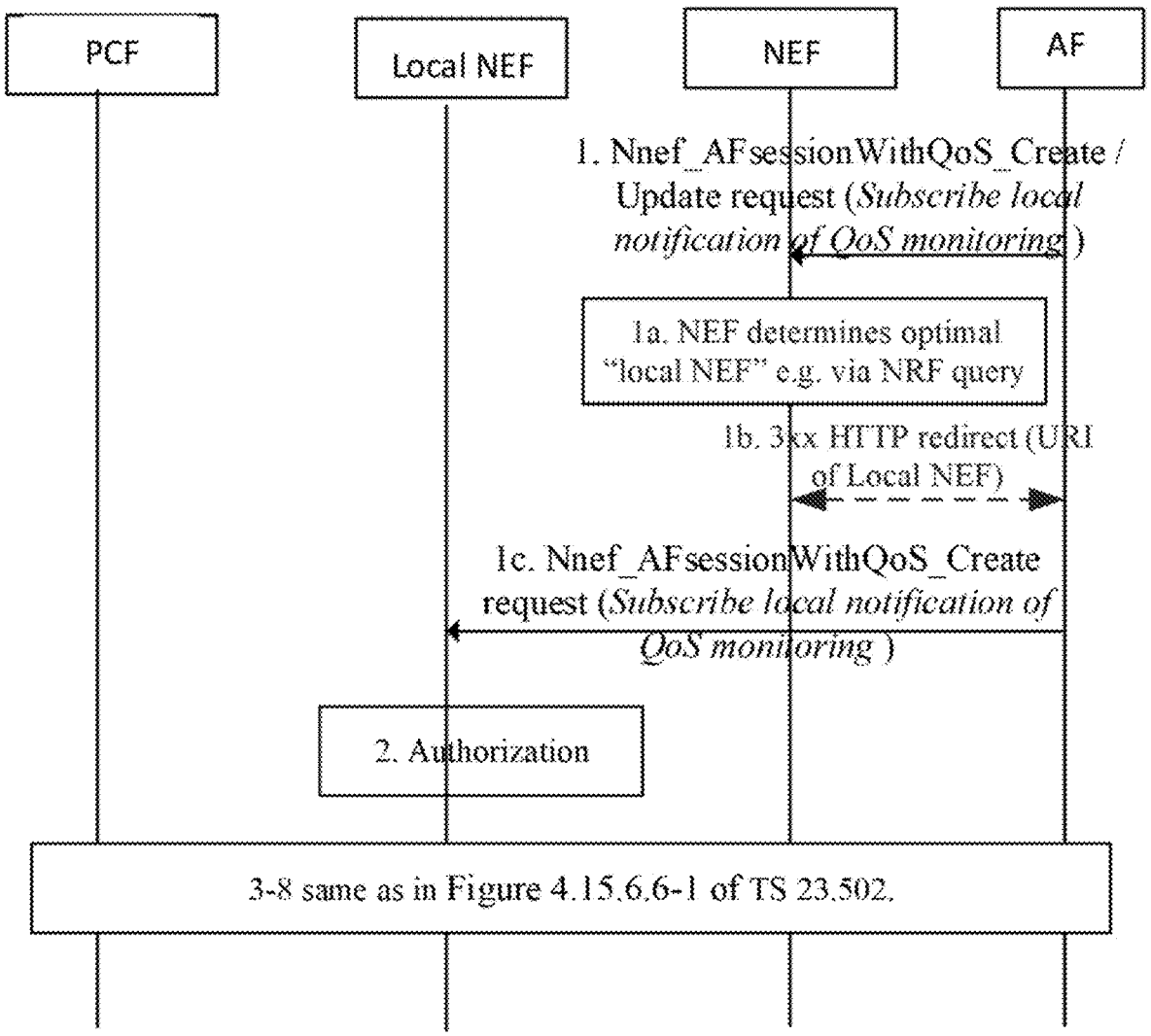
FIGS. 8 and 9 are signaling flowcharts according to certain examples.

Signaling procedure for such operation is shown in FIG. 8. The request sent in message 1 can include an indication by the AF that the request expects the 5GC to provide local notifications. The AF can send a request about a PDU session, e.g., a request to reserve resources for an AF session by using Nnef_AFsessionWithQoS_Create request message. The Nnef_AFsessionWithQoS_Create request message or a subsequent Nnef_AFsessionWithQoS_Update request message may carry a request to be notified with information about the UE. Usage of Nnef_AFsessionWithQoS_Create request message is only illustrative and other API exposed by the NEF may be used for step 1.

An alternative is operation based on a local configuration in the NEF that the given AF is associated with the requirement of local notifications. The NEF receiving the request may issue a redirect to the local NEF.

In stage 1a the NEF upon receiving the request and indication of local notification (e.g. of QoS monitoring), determines an optimal local NEF to use for the particular PDU session/DNAI.

The NEF can determine an optimal local NEF for example per a procedure where the NEF retrieves from a UDM the SMF serving the PDU Session and then retrieves from this SMF additional information regarding the UE's PDU session and local PSA, such as Local PSA-UPF Location ID, or Local PSA locality information (e.g. geographical location or Data Center where UPF is deployed), and use this information in the NF discovery request to NRF. The NEF may alternatively, or in addition, retrieve the current location of the UE and/or the identity of the local PSA inserted in the path of the PDU session, and may then issue an NF Discovery Request to the NRF to find NEFs that are the closest to the local PSA or user location.

For this purpose, the registered NEF profile may be enhanced with information to assist the NEF (or other network functions) in selecting an optimal local NEF. Below table 1 provides an example of possible enhancements, listed in the third and second rows from the bottom, to the current definition of type NefInfo in accordance with 3GPP TS 29.510. The example NEF profile extensions in NRF enable the NEF to register assistance information.

TABLE 1

| Attribute name | Data type | P | Cardinality | Description |
| --- | --- | --- | --- | --- |
| nefId | NefId | C | 0 . . . 1 | This IE shall be present and contain the NEF ID of the NEF if NIDD service is supported. |
| pfdData | PfdData | O | 0 . . . 1 | PFD data. The NRF shall return the NEF profiles that have at least one nnef-pfdmanagement service matching the application identifiers and/or application function identifiers in the corresponding identifier list. If not included, the NRF shall return all the application identifiers and/or application function identifiers registered in the NEF profile. |

TABLE 1-continued

| Attribute name | Data type | P | Cardinality | Description |
| --- | --- | --- | --- | --- |
| afEeData | AfEventExposureData | O | 0 . . . 1 | The AF provided event exposure data. The NEF registers such information in the NRF on behalf of the AF. |
| gpsiRanges | array(IdentityRange) | O | 1 . . . N | Range(s) of External Identifiers |
| externalGroupIdentifiersRanges | array(IdentityRange) | O | 1 . . . N | Range(s) of External Group Identifiers |
| servedFqdnList | array(string) | O | 1 . . . N | Pattern (regular expression according to the ECMA-262 dialect [8]) representing the Domain names served by the NEF |
| taiList | array(Tai) | O | 1 . . . N | Assistance information needed to select local NEF, comprising list of Tracking Area Identifiers the NEF can serve |
| localPsaUpfLocationIdList | array(localPsaUpfLocationId) | O | 1 . . . 1 | Assistance information needed to select local NEF, comprising a list of local PSA location identifiers |
| locality | string | O | 0 . . . 1 | Locality information |

In stage 1b of FIG. 8, if the NEF receiving the request has determined that there is a more optimal local NEF, the NEF can redirect the request to that local NEF, for example using 307 or 308 HTTP redirection. The URI of the select local NEF or other address information can be provided to the AF.

The AF can then re-send in message 1c a request, as instructed by the HTTP 307 or 308 redirection message to the selected local NEF. The message can comprise, for example, a Nnef_AFsessionWithQoS_Create request (Subscribe local notification of QoS monitoring).

In accordance with an alternative the AF is responsible for the optimal local NEF selection using assistance information received from the PLMN. The PLMN can determine and signal information identifying a potential local NEF, or a list of local NEFs, for use for the UE's PDU session to the AF close to the EAS. The PLMN may also provide assistance information to the AF that can be used by the AF to discover a local NEF to use.

The AF may query or subscribe to the PLMN to retrieve the local NEF to use and/or retrieve the assistance information to optimally select the local NEF. The AF query may be a standalone query or a query sent along with the request to trigger other action such as QoS monitoring.

The assistance information may, e.g., comprise locality information and/or a local PSA-UPF location ID. The location ID may be in format that does not need to be interpreted by the AF so that the AF can simply insert it as a new query parameter in a NF Discovery Request it sends to the NRF to discover the local NEF. The NEFs can register the same information in their profiles in the NRF. This allows the NRF to determine the optimal candidate local NEF to return in the NF Discovery Response.

The AF can make the final choice. This enables it to take possible other constraints into account and the received assistance information rather than a selected NEF can be used to further optimize selection of a local NEF. As above, the SMF may provide to a requester, the 1st NEF, the PSA-UPF location ID of the local PSA inserted in the path of the PDU session. The local NEF can be registered in the NRF with the PSA-UPF location ID, the NRF thereby being made capable of supporting a request to discover a NEF using PSA-UPF Location ID as a discovery criterion.

Figure 9:
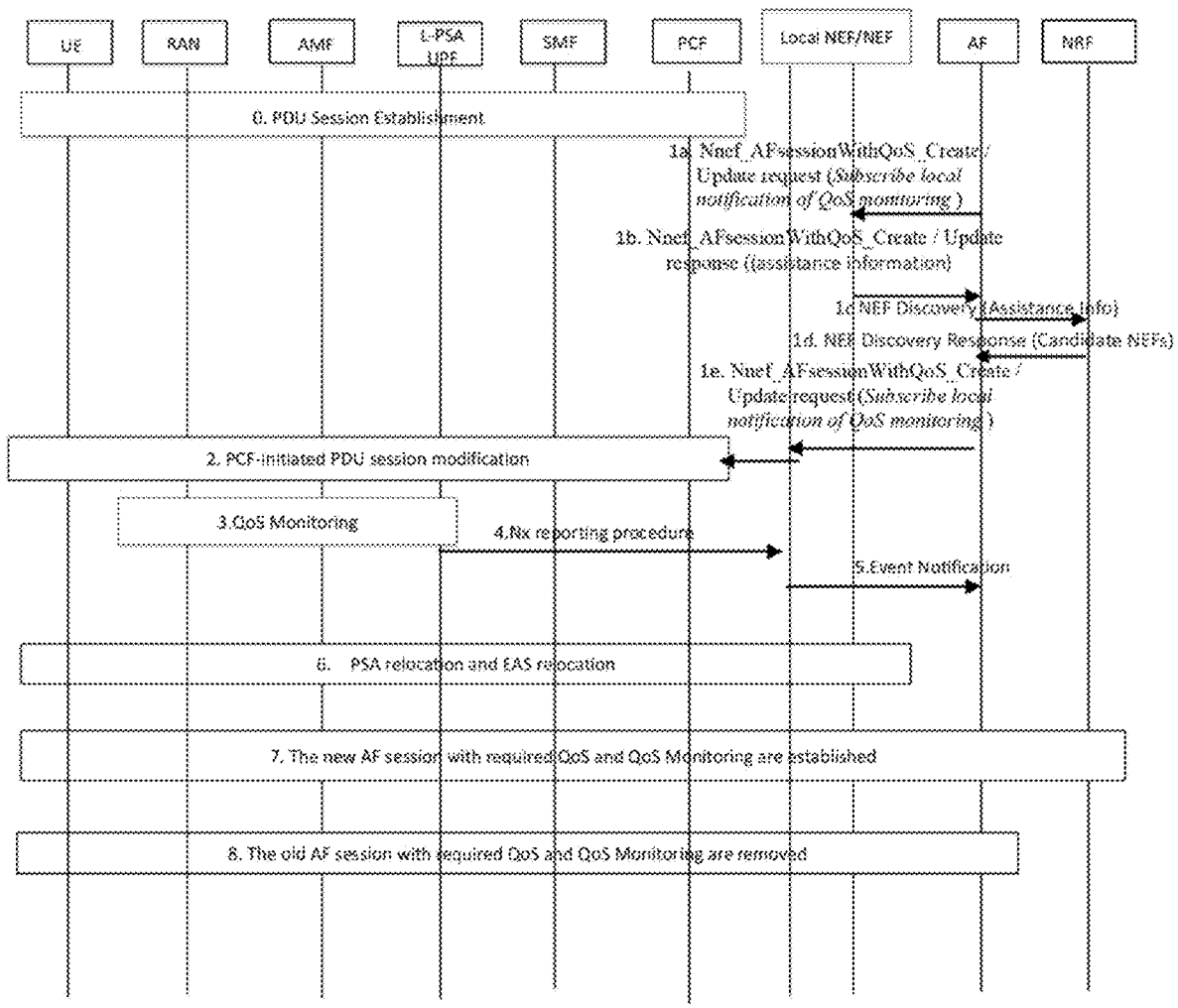

FIG. 9 illustrates an example for the association establishment between a local UPF and a local NEF where the AF is responsible for determining the optimal local NEF with the assistance from the PLMN.

A UE establishes a PDU Session at stage 0. A local PSA can be used by this PDU Session. The AF can then initiate by message 1a an AF session with required QoS procedure. In the request, the AF may subscribe local notification of QoS monitoring to a policy control function (PCF) either via a local NEF or via (other) NEF. For the QoS monitoring, the AF can include the corresponding QoS monitoring parameters. The local AF can be configured to find a local NEF. The PLMN, and in the example the NEF that received message 1a, can then determine and provide in message 1b information to AF on the optimal local NEF (from the PLMN perspective) recommended to be used to AF. A list of alterative local NEFs may be provided. Alternatively, or in addition, the PLMN/NEF can provide assistance information that helps the AF to select the optimal local NEF. This assistance information may, for example, take the form of a local PSA-UPF location ID and/or locality information.

This assistance information can be 5GC and PLMN specific. The assistance information may not necessarily need to be in form understood by the AF. The NEF profile in the NRF can register the same assistance information, e.g. locality or local PSA-UPF location ID it can serve.

The AF can then use the assistance information in the selection and fetch NEF candidate information by messages 1c and 1d. Message 1e can then be sent to the selected local NEF.

The PLMN information may be returned to the AF as a response to a standalone query from the AF for retrieving this information, or this can be returned as part of response to the AF query (e.g. to trigger QoS monitoring). In the latter case, the PLMN determines this information upon the policy control function (PCF) receiving a message, for example a message such as the 3GPP Npcf_Authorization_subscribe.

NEF profile retrieval via NRF discovery procedure can be, e.g., per definitions of 3GPP TS 23.502. NEF profile can be enhanced as shown in table 1 above to enable the NEF to register the assistance information.

The AF may also use the current Tracking Area Identifiers (TAI) of the UE as one of the criteria to select optimal local NEF. In this case, the AF can also subscribe to the AMF to obtain UE location information. The optimal local NEF can be determined to be the one which is close to currently serving local PSA-UPF, and/or also close (e.g. geographically) to the AF. The NEF and the AF do not necessarily know the PSA-UPF. However, the SMF can select a PSA-UPF based on UE location and DNAI information.

In accordance with a possibility a list of Tracking Area Identifiers (TAIs) each NEF can optimally support is added in the NEF profile that is registered in the relevant NRF.

An AF may get a local PSA-UPF location ID as part of a SMF notification. For example, as an enhancement to SMF notification API.

In accordance with a possibility a local NEF can be discovered for or by an AF for a group of UEs. The determination may be based on the location of the AF.

It is noted that while the above describes example embodiments, there are several variations and modifications which may be made to the disclosed solution without departing from the scope of the present invention. Different features from different embodiments may be combined.

Although the access network is wireless in the figures shown, any other access types are valid as the 5G core is specified to interwork with multiple types of wireline and wireless accesses.

The embodiments may vary within the scope of the claims. Various hardware and/or software components can provide the means necessary to implement the herein described principles. In general, some of the examples may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. At least a part of the functions can be provided in virtualised environment, and at least some of the entities can be provided as virtual computing instances. Further in this regard it should be noted that any of the above procedures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples.

Alternatively or additionally some embodiments may be implemented using circuitry. The circuitry may be configured to perform one or more of the functions and/or method procedures previously described. That circuitry may be provided in the network entity and/or in the communications device and/or a server and/or a device.

As used in this application, the term "circuitry" may refer to one or more or all of the following:

(a) hardware-only circuit implementations (such as implementations in only analogue and/or digital circuitry);

(b) combinations of hardware circuits and software, such as:
(i) a combination of analogue and/or digital hardware circuit(s) with software/firmware and
(ii) any portions of hardware processor(s) with software (including digital signal processor(s)), software, and memory(ies) that work together to cause the communications device and/or device and/or server and/or network entity to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

It is noted that whilst embodiments have been described in relation to certain architectures, similar principles can be applied to other systems. Therefore, although certain embodiments were described above by way of example with reference to certain exemplifying architectures for wireless networks, technologies standards, and protocols, the herein described features may be applied to any other suitable forms of systems, architectures and devices than those illustrated and described in detail in the above examples. It is also noted that different combinations of different embodiments are possible. It is also noted herein that while the above describes exemplifying embodiments, there are several variations and modifications which may be made to the disclosed solution without departing from the spirit and scope of the present invention.

The invention claimed is:

1. A method, comprising:
receiving in a network function entity from an application function entity a request relating to a data communication session;
determining a need to determine at least one local network exposure function entity for the application function entity;
determining information of at least one local network exposure function entity for the application function entity;
selecting a local network exposure function entity for the application function entity taking into account location information, wherein the location information comprises at least one of a location identifier of an associated local user plane function, an identifier of an associated local user plane function, an identifier of a tracking area, and information of a location of a device associated with the data communication session; and
providing the application function entity with information on the selected local network exposure function entity via redirection of the application function entity to the selected local network exposure function entity.

2. The method according to claim 1, wherein the determining a need to determine at least one local network exposure function entity for the application function entity is based on an indication in the request indicating a need to determine at least one local network exposure function entity for the application function entity.

3. The method according to claim 1, wherein the determining a need to determine at least one local network exposure function entity for the application function entity is based on a configuration indicating a need to determine at least one local network exposure function for the application function entity.

4. The method according to claim 1, wherein the determining information of at least one local network exposure function entity for the application function entity comprises discovering the at least one local network exposure function entity from a repository function based on information associated with a packet data unit session anchor associated with the data communication session.

5. The method according to claim 4, further comprising receiving from a session management function entity the information associated with the packet data unit session anchor associated with the data communication session.

6. The method according to claim 1, wherein the request includes an indication of a need to determine at least one local network exposure function entity.

7. A method, comprising:
sending a request relating to a data communication session to a network function entity;
receiving in response information about at least one local network exposure function entity determined as suitable by the network function entity;
selecting a local network exposure function entity using the received information and taking into account location information, wherein the location information comprises at least one of a location identifier of an associated local user plane function, an identifier of an associated local user plane function, an identifier of a tracking area, and information of a location of a device associated with the data communication session; and
using a local network exposure function entity for the data communication session accordingly.

8. The method according to claim 7, further comprising receiving information of a local network exposure function entity selected by the network function entity, and using the selected local network exposure function entity.

9. The method according to claim 7, wherein the request includes an indication of a need to determine at least one local network exposure function entity.

10. A method, comprising:
receiving a request to discover a network exposure function entity based on information associated with a local user plane function or location of at least one user device;
determining at least one network exposure function based on said information and based on information registered for at least one network exposure function entity regarding local user plane functions or location of at least one user device the at least one network exposure function supports; and
providing, in response, information of at least one network exposure function from said determination.

11. An apparatus, comprising:
at least one processor; and
at least one memory including computer program code, the at least one memory and computer program code configured to, with the at least one processor, cause the apparatus at least to:
receive from an application function entity a request relating to a data communication session;
determine a need to determine at least one local network exposure function entity for the application function entity;
determine information of at least one local network exposure function entity for the application function entity;
select a local network exposure function entity for the application function entity taking into account location information, wherein the location information comprises at least one of a location identifier of an associated local user plane function, an identifier of an associated local user plane function, an identifier of a tracking area, and information of a location of a device associated with the data communication session; and
provide the application function entity with information on the selected local network exposure function entity via redirection of the application function entity to the selected local network exposure function entity.

12. The apparatus according to claim 11, wherein the at least one processor and the at least one memory including the computer program code are further configured to cause the apparatus at least to:
determine the need to determine at least one local network exposure function entity for the application function entity based on an indication in the request indicating a need to determine at least one local network exposure function entity for the application function entity.

13. The apparatus according to claim 11, wherein the at least one processor and the at least one memory including the computer program code are further configured to cause the apparatus at least to:
determine the need to determine at least one local network exposure function entity for the application function entity based on a configuration indicating a need to determine at least one local network exposure function for the application function entity.

14. The apparatus according to claim 11, wherein the at least one processor and the at least one memory including the computer program code are further configured to cause the apparatus at least to:
determine the information of at least one local network exposure function entity for the application function entity via discovering the at least one local network exposure function entity from a repository function based on information associated with a packet data unit session anchor associated with the data communication session.

15. The apparatus according to claim 14, wherein the at least one processor and the at least one memory including the computer program code are further configured to cause the apparatus at least to:
receive from a session management function entity the information associated with the packet data unit session anchor associated with the data communication session.

16. The apparatus according to claim 11, wherein the request includes an indication of a need to determine at least one local network exposure function entity.

17. An apparatus, comprising:
at least one processor; and
at least one memory including computer program code, the at least one memory and computer program code configured to, with the at least one processor, cause the apparatus at least to:
send a request relating to a data communication session to a network function entity;
receive in response information about at least one local network exposure function entity determined as suitable by the network function entity;
select a local network exposure function entity using the received information and taking into account location information, wherein the location information comprises at least one of a location identifier of an associated local user plane function, an identifier of an associated local user plane function, an identifier of a tracking area, and information of a location of a device associated with the data communication session; and use a local network exposure function entity for the data communication session accordingly.

18. The apparatus according to claim 17, wherein the at least one processor and the at least one memory including the computer program code are further configured to receive information of a local network exposure function entity selected by the network function entity, and to use the selected local network exposure function entity.

19. The apparatus according to claim 17, wherein the request includes an indication of a need to determine at least one local network exposure function entity.

20. An apparatus, comprising:
at least one processor; and
at least one memory including computer program code, the at least one memory and computer program code configured to, with the at least one processor, cause the apparatus at least to:
receive a request to discover a network exposure function entity based on information associated with a local user plane function or location of at least one user device;
determine at least one network exposure function based on said information and based on information registered for at least one network exposure function entity regarding local user plane functions or location of at least one user device the at least one network exposure function supports; and
provide, in response, information of at least one network exposure function from said determination.

* * * * *